United States Patent [19]

Nastas

[11] Patent Number: 5,199,210

[45] Date of Patent: Apr. 6, 1993

[54] LIVE ANIMAL TRAP

[76] Inventor: Anthony Nastas, 1840 W. Lawrence Ave., Ellwood City, Pa. 16117

[21] Appl. No.: 958,706

[22] Filed: Oct. 9, 1992

[51] Int. Cl.⁵ ............................................. A01M 23/16
[52] U.S. Cl. ........................................................ 43/61
[58] Field of Search ..................... 43/61, 60, 58, 62, 63

[56] References Cited

U.S. PATENT DOCUMENTS

| | | | |
|---|---|---|---|
| 443,975 | 12/1890 | Pead | 43/61 |
| 583,924 | 6/1977 | McCoy | 43/61 |
| 1,399,630 | 12/1921 | Livezey | 43/61 |
| 2,478,605 | 8/1949 | Symens | 43/61 |
| 2,510,168 | 6/1950 | Caldwell et al. | 43/61 |
| 2,524,504 | 10/1950 | Woolworth | 43/61 |

Primary Examiner—Richard K. Seidel
Assistant Examiner—Chuck Y. Mah
Attorney, Agent, or Firm—Norman B. Rainer

[57] ABSTRACT

An animal trap adapted to capture unharmed a single animal is made of an elongated rectangular cage having roof and floor panels, side panels, and a rear panel. The forward extremity has a vertically slidably door panel adapted to fall by gravity, its downward motion being guided by tracks in the side panel. A bait-holding tray disposed within the cage toward the rear panel is supported by a vertical rod pendantly held by a retainer slidably disposed upon the roof panel. An elongated trip rod extends from the retainer and penetrates a lock-up aperture in the door panel. When the animal pushes upon the bait-holding tray, rewarward movement of the trip rod releases the door panel for gravitationally urged downward movement, thereby sealing the cage.

6 Claims, 2 Drawing Sheets

LIVE ANIMAL TRAP

BACKGROUND OF THE INVENTION

1. Field of the Invention

This invention relates to animal traps, and more particularly concerns a live animal trap having a simple and reliable triggering mechanism.

2. Description of the Prior Art

Heretofore, although most animal traps have generally served their intended purpose, they have been subject to one or more of the following disadvantages:

1. They have been complicated in construction and thus difficult and expensive to manufacture;
2. They have been unreliable in operation;
3. They have been difficult to handle because of their weight or construction;
4. They have been difficult to set because of their construction and, in some cases, have been dangerous to the user in setting them because of a sensitive setting mechanism which can release the trap while being handled by the user; and/or
5. They have been so constructed as to require the handling of a dead animal caught therein if the trap is to be reused.

Various types of live animal traps have earlier been disclosed which utilize an enclosed cage having a door at one or both ends thereof. The door is held in an open position by a trigger mechanism which can be actuated from within the cage. When the animal enters the cage and touches the trip mechanism, the door is caused to close so as to enclose the animal in the trap Some prior art live animal traps place the trip mechanism near the front of the cage. Consequently, the animal is often not completely within the trap before tripping the door. On many occasions, this results in the door not closing satisfactorily, or injury and/or escape of the animal.

Another disadvantage of many prior art cages is that the linkage means extending from the trip mechanism to the door is often in a position where it will be engaged by the animal accidentally before the animal is completely within the cage. Also, many prior art trip mechanisms involve complicated linkages which do not permit instant release of the door.

Another disadvantage of prior art devices is the difficulty in opening the door after the animal has been trapped inside. In order to release the door to the cage, it is often necessary in prior art devices to place one's hand near the cage where a live animal can scratch or bite.

The aforementioned limitations and disadvantages have been addressed in the prior art. For example, U.S. Pat. No. 4,829,700 to Ha discloses a trap having solid walls and a trigger mechanism comprised of a pivoting treadle panel and linkages adapted to effect closure of a trap door. This device, however, does not enable the animal to see and smell the bait contained therein. U.S. Pat. Nos. 4,912,872 and 4,829,701 to Wynn et al. and ImBrogno, respectively, disclose a live animal trap having a treadle panel trigger pivotally linked to a door closure mechanism. Such pivoted treadle arrangements are subject to malfunction when encumbered with snow and ice. Furthermore, prior devices can be triggered by an animal from the outside of the trap or before the animal is completely within the confines of the trap.

The animal trap of the present invention is not subject to the above mentioned disadvantages, and possesses certain advantages not inherent in earlier traps.

It is accordingly an object of the present invention to provide an animal trap for capturing an animal of similar dimension in an unharmed condition.

It is another object of the present invention to provide a trap of the foregoing object having a simple and reliable trigger mechanism.

It is a further object of this invention to provide a trap of the aforesaid nature not easily triggered by the animal while outside the trap.

It is yet another object of this invention to provide a trap of the aforesaid nature which is not adversely impaired in functionality by inclement weather or debris.

It is a still further object of this invention to provide a trap of the aforesaid nature which is durable and amenable to low cost manufacture.

These and other beneficial objects and advantages will be apparent from the following description.

SUMMARY OF THE INVENTION

The above and other beneficial objects and advantages are accomplished in accordance with the present invention by an animal trap adapted to capture a single animal, said trap comprised of:

a) an elongated cage having forward and rear extremities and an interior region bounded in part by spaced apart roof and floor panels, paired parallel side panels orthogonally disposed to said roof and floor panels, and a rear panel, said roof panel having an elongated aperture centered between said side panels and extending in a direction between said forward and rear extremities, b) a framework associated with said forward extremity and comprised of spaced apart paired side channel members and a lower channel member orthogonally joining said side channel members, said channel members having continuous grooves directed toward said interior region and centered upon a plane perpendicularly disposed to said roof panel, c) a substantially rectangular door panel having upper, lower and side extremities, and adapted to travel vertically within said framework, said side extremities slidably engaging the grooves of said side channel members, said lower extremity configured to engage the groove of said lower channel member upon extreme downward travel of said door panel, thereby closing said forward extremity, said door panel having a lockup aperture adjacent said lower extremity, d) retainer means associated with said slotted aperture and adapted to slidably engage said roof panel, e) an elongated trip rod adapted to reciprocally travel above said roof panel, said trip rod having a proximal extremity fixedly associated with said retainer means and a distal extremity adapted to penetratively engage said lockup aperture, thereby maintaining said trap door panel in an upward, open disposition against the urging of gravitational force, and f) bait holding means residing within said interior region and suspended by said retainer means, whereby, a) said trap is set by raising said door panel to its upper limit and sliding said trip rod forward to engage said lockup aperture, and b) said trap is tripped when an animal enters the open forward extremity of said cage in search of said bait and pushes on said bait holding means, thereby rearwardly displacing said retainer means and trip rod, causing release of said door panel and the falling thereof with consequent sealing of the cage.

In a preferred embodiment, the side and floor panels of the cage may be constructed of a wire mesh material. The roof panel, rear panel and door panel may be constructed from galvanized sheet metal or other corrosion resistant sheet material. The bait holding means may be in the form of a tray or pan suspended from the retainer means by a vertical post. In alternative embodiments, the bait holding means may be a skewer upon which a chunk of bait is impaled.

The trap may be equipped with a carrying handle traversely associated with said roof panel. A second, locking door may be hingedly associated with said rear panel in order to achieve head-first release of captured animals.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
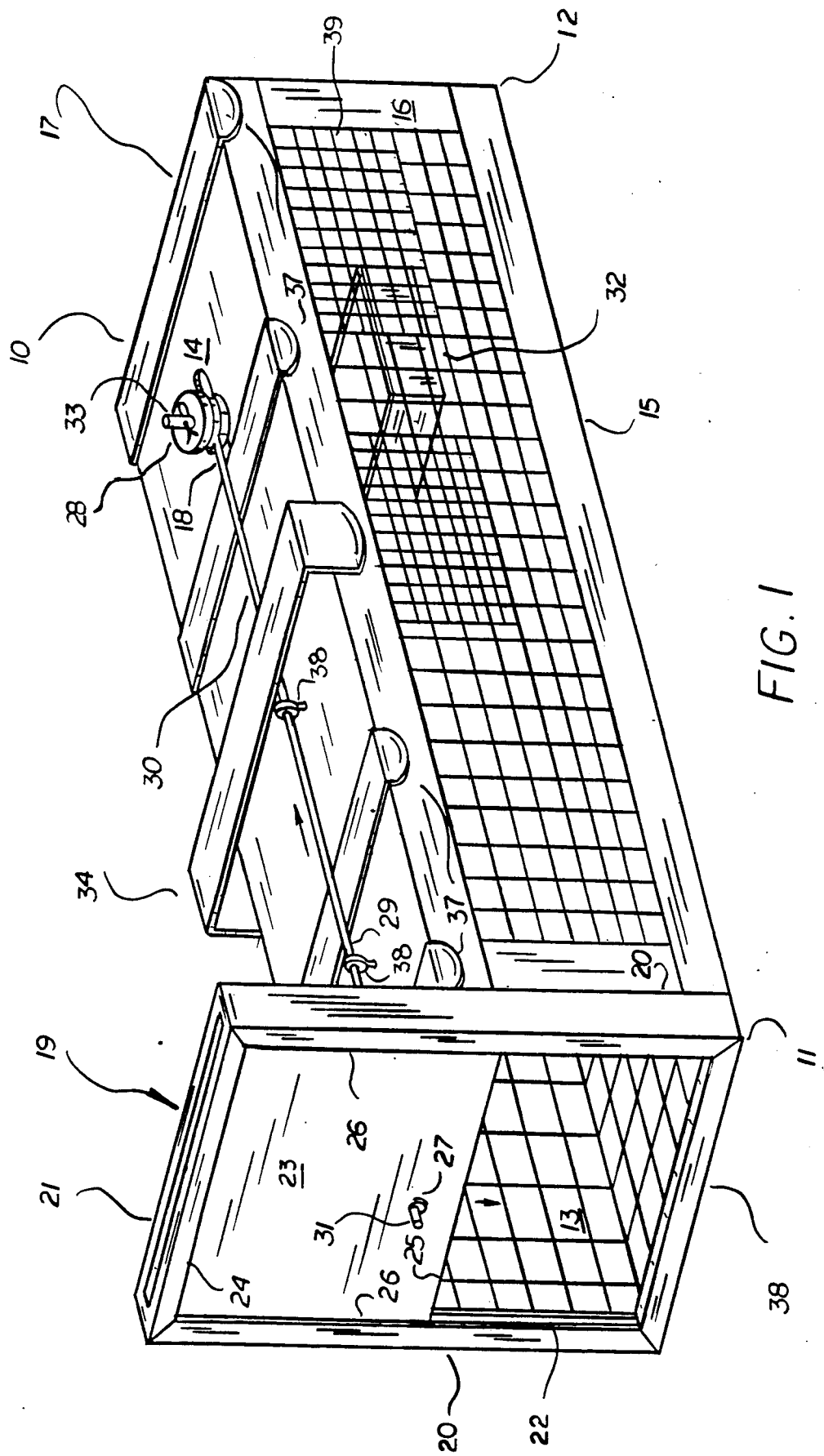
FIG. 1 is a perspective view of an embodiment of the animal trip of the present invention.
Figure 2:
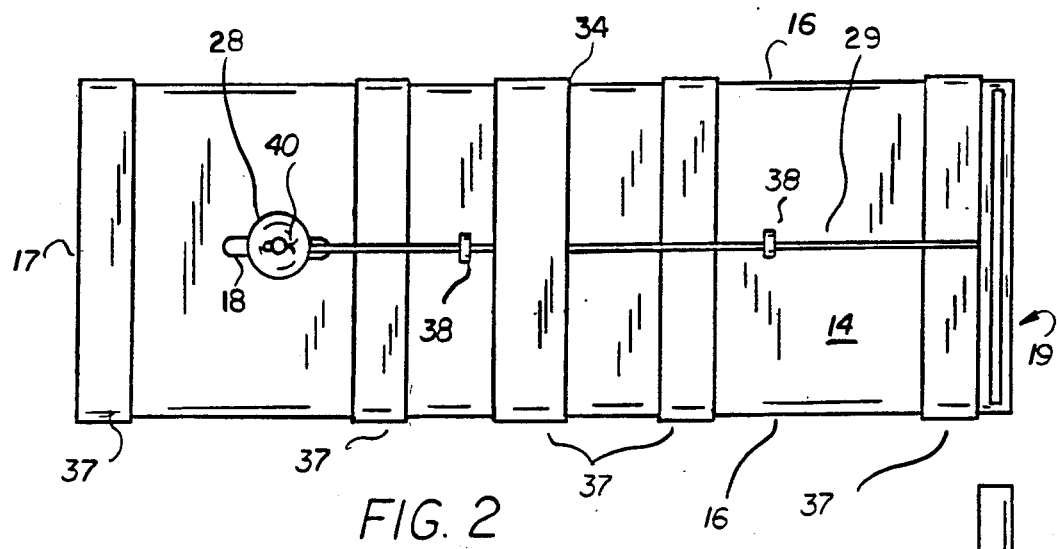
FIG. 2 is a top plan view of the embodiment of FIG. 1.
Figure 3:
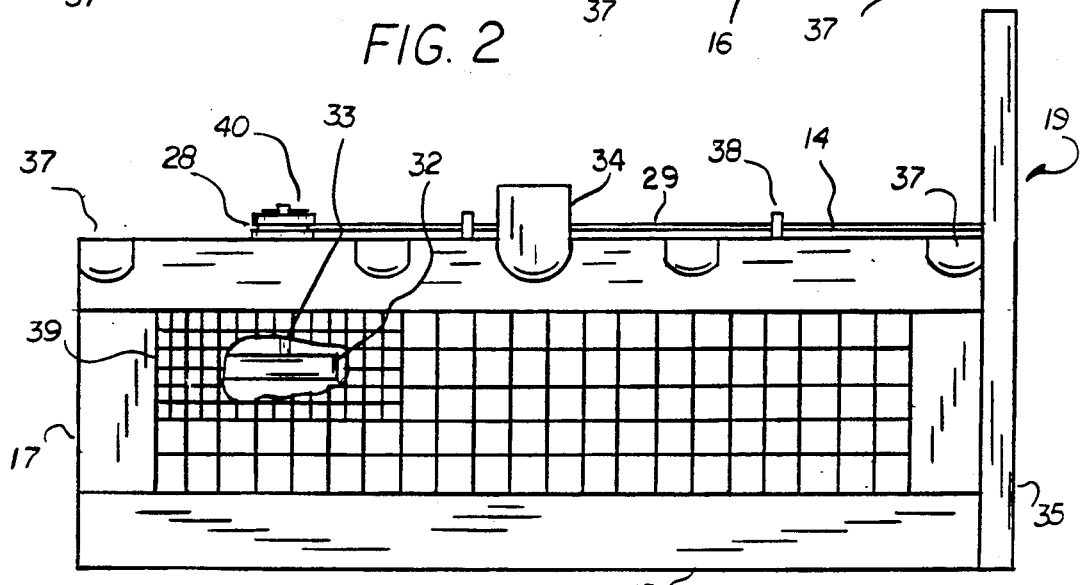
FIG. 3 is a side view of the embodiment of FIG. 1.
Figure 5:
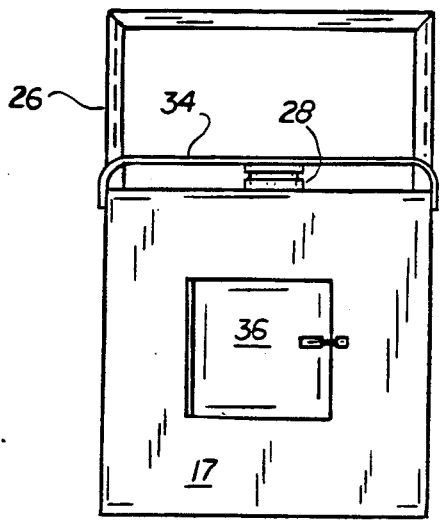
FIG. 5 is a rear view.
Figure 4:
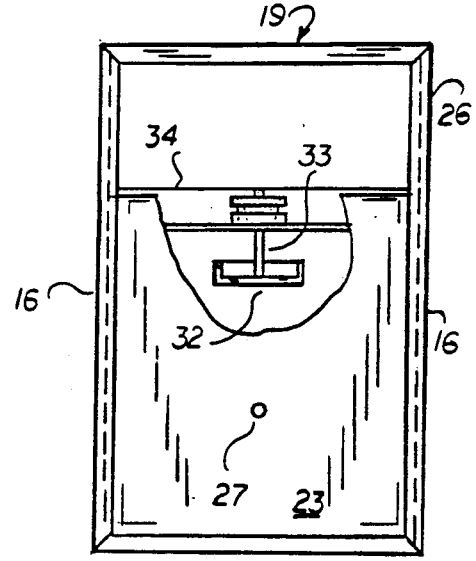
FIG. 4 is a front view.

Referring to FIGS. 1-5, an embodiment of the animal trap of the present invention is shown comprised of an elongated cage 10 having forward and rear extremities 11 and 12, respectively, and an interior region 13 bounded in part by spaced apart roof and floor panels 14 and 15, respectively, paired parallel identical side panels 16 orthogonally disposed to said roof and floor panels, and rear panel 17 disposed at said rear extremity. An elongated aperture or slot 18, disposed within roof panel 14, is centered between said side panels and extends in a direction between said forward and rear extremities. Said panels are preferably flat, and may be fabricated of sheet metal and plastic stock, or constructed of a multitude of uniformly spaced bars or interactive wires forming a network or grid structure. The roof panel is preferably fabricated of non-porous material whereas the floor and side panels are preferably highly apertured, permitting air passage and minimal visual obstruction. In the illustrated embodiment, roof panel 14 is reinforced by gussets 37.

A framework 19 of rectangular configuration is positioned at forward extremity 11 and comprised of spaced apart paired side channel members 20 and paired upper and lower channel members 21 and 38, respectively. Said channel members have continuous grooves 22 directed toward said interior region and centered upon a plane perpendicularly disposed to the roof, floor and side panels of said cage. Said grooves 22 of the several channel members communicate with each other, effectively forming a circuitous groove of rectangular contour. In alternative embodiments, upper channel member 21 may be omitted.

Door panel 23, of rectangular shape having upper and lower extremities 24 and 25, respectively, and side extremities 26, is slidably retained by grooves 22 and is adapted to travel vertically within said framework. The side extremities 26 of the door engage the grooves in side channel members 20. When the door panel is in its lowermost portion, lower extremity 25 becomes seated within the groove of lower channel member 38. When the door panel is in its uppermost position, its upper extremity 24 becomes seated within the groove of upper channel member 21. In its lowermost position of travel, said door panel seals the forward extremity of the cage. In its uppermost position, the door enables an animal to enter the cage. A lockup aperture 27 is positioned in said door panel adjacent lower extremity 25.

Retainer means, having the form of flat-bottomed block 28, is disposed above slotted aperture 18. Elongated trip rod 29, disposed above roof panel 14 and supported by eyelets 38, has a proximal extremity 30 fixedly associated with block 28, and a distal extremity 31 adapted to penetratively engage lockup aperture 27. When trip rod 29 engages aperture 27, door panel 23 is held in its uppermost, open disposition against the urging of gravitational force.

Bait holding means, in the form of tray 32 attached by vertical post 33 and cotter pin 40 to block 28, is disposed within interior region 13 adjacent rear extremity 12. Such removable manner of attachment facilitates maintenance and adjustments necessitated by long term use. Fine wire mesh 39 is associated with side panels 16 adjacent tray 32 and adapted to prevent animals from reaching through the side panel and thereby prematurely tripping the trap. In operation, the trap is set by raising said door panel to its uppermost position, securing the door panel by sliding the trip rod forwardly to engage the lockup aperture, and placing a bait upon the bait holding means. The trap is tripped when an animal enters the open forward extremity of the cage in pursuit of the bait, and pushes rearwardly on the bait holding means. Such action causes sliding rearward displacement of the retainer means with consequent removal of the trip rod form the lockup aperture and attendant downward motion of the door panel.

A carrying-handle 34 may optionally be disposed above the roof panel, preferably transversely disposed to long axis 35 of the cage. An auxiliary lockable door 36 may be hingedly associated with rear panel 17 to facilitate head-first removal of captured animals.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An animal trap adapted to capture a single animal, said trap comprised of:
   a) an elongated cage having forward and rear extremities and an interior region bounded in part by spaced apart roof and floor panels, paired parallel side panels orthogonally disposed to said roof and floor panels, and a rear panel, said roof panel having an elongated aperture centered between said side panels and extending in a direction between said forward and rear extremities, b) a framework associated with said forward extremity and comprised of spaced apart paired side channel members and a lower channel member orthogonally joining said side channel members, said channel members having continuous grooves directed toward said interior region and centered upon a plane perpendicularly disposed to said roof panel, c) a substantially rectangular door panel having upper, lower and side extremities, and adapted to travel vertically within said framework, said side extremities slidably engaging the grooves of said side channel members, said lower extremity configured to engage the groove of said lower channel member upon extreme downward travel of said door panel, thereby closing said forward extremity, said door panel having a lockup aperture adjacent said lower extremity, d) retainer means associated with said elongated aperture and adapted to slidably engage said roof panel, e) an elongated trip rod adapted to reciprocally travel above said roof panel, said trip rod having a proximal extremity fixedly associated with said retainer means and a distal extremity adapted to penetratively engage said lockup aperture, thereby maintaining said trap door panel in an upward, open disposition against the urging of gravitational force, and f) bait holding means residing within said interior region and suspended by said retainer means, whereby, said trap is set by raising said door panel to its upper limit and sliding said trip rod forward to engage said lockup aperture, and said trap is tripped when an animal enters the open forward extremity of said cage in search of said bait and pushes on said bait holding means, thereby rearwardly displacing said retainer means and trip rod, causing release of said door panel and the falling thereof with consequent sealing of the cage.

2. The animal trap of claim 1 wherein said bait holding means is in the form of a tray which is joined by a vertical post to said retainer means.

3. The animal trap of claim 2 wherein said vertical post is removably joined to said retainer means.

4. The animal trap of claim 1 wherein said side panels are comprised at least in part of an open grid structure.

5. The animal trap of claim 1 further provided with a carrying handle disposed above said roof panel and extending orthogonally between said side panels.

6. The animal trap of claim 1 wherein said rear panel contains a second, locking door.

* * * * *